United States Patent
Ohtani

(10) Patent No.: US 9,621,711 B2
(45) Date of Patent: Apr. 11, 2017

(54) COMMUNICATION CONTROL DEVICE, COMMUNICATION APPARATUS, IMAGE FORMING APPARATUS, AND COMPUTER-READABLE RECORDING MEDIUM

(71) Applicant: Masahito Ohtani, Kanagawa (JP)

(72) Inventor: Masahito Ohtani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/149,232

(22) Filed: May 9, 2016

(65) Prior Publication Data

US 2016/0337509 A1 Nov. 17, 2016

(30) Foreign Application Priority Data

May 11, 2015 (JP) ................................. 2015-096579

(51) Int. Cl.
| | | |
|---|---|---|
| *H04M 11/00* | (2006.01) | |
| *H04M 1/82* | (2006.01) | |
| *H04M 1/24* | (2006.01) | |
| *H04N 1/00* | (2006.01) | |

(52) U.S. Cl.
CPC ............... *H04M 1/82* (2013.01); *H04M 1/24* (2013.01); *H04N 1/0001* (2013.01);
(Continued)

(58) Field of Classification Search
CPC ............ H04M 1/00; H04M 1/24; H04M 1/82; H04M 1/84; H04N 1/00127;
(Continued)

(56) References Cited

U.S. PATENT DOCUMENTS 5,278,665 A 1/1994 Sawada et al.
5,341,377 A 8/1994 Ohtani
(Continued)

FOREIGN PATENT DOCUMENTS

JP 08-070345 3/1996
JP 2004-104311 4/2004

*Primary Examiner* — Binh Tieu
(74) *Attorney, Agent, or Firm* — Cooper & Dunham LLP

(57) ABSTRACT

A communication control device for controlling communication performed over a communication line includes a voltage-value acquirer for acquiring a value of a line-to-line voltage of the communication line in an on-hook state, a first determiner for determining whether the voltage value is continuously equal to or lower than a threshold voltage for a first predetermined duration, a current-value acquirer for acquiring a value of a current flowing through the communication line in an off-hook state when the voltage value is continuously equal to or lower than the threshold voltage for the first predetermined duration, a second determiner for determining whether the current value is continuously equal to or smaller than a threshold current for a second predetermined duration, and a disconnection determiner for determining that the communication line is disconnected when the current value is continuously equal to or smaller than the threshold current for the second predetermined duration.

9 Claims, 8 Drawing Sheets

(52) U.S. Cl.
CPC ..... *H04N 1/00037* (2013.01); *H04N 1/00058* (2013.01); *H04N 1/00281* (2013.01); *H04N 2201/0094* (2013.01)

(58) Field of Classification Search
CPC ........... H04N 1/00323; H04N 1/00885; H04N 1/00899; H04N 1/00209; H04N 1/32704; H04N 1/32708; H04N 1/32715; H04N 1/32728; H04N 2201/0094
USPC ..... 379/1.01, 2, 14.01, 24, 27.01, 27.04, 28, 379/29.03, 24.04, 29.07, 29.1, 32.01, 379/32.04, 100.01, 100.03, 100.05, 379/100.06, 100.02
See application file for complete search history.

(56) References Cited

U.S. PATENT DOCUMENTS

| | | | |
|---|---|---|---|
| 6,108,099 A | 8/2000 | Ohtani | |
| 6,393,123 B1* | 5/2002 | Staver | H04M 1/82 379/377 |
| 9,167,128 B2* | 10/2015 | Maruyama | H04N 1/32728 |
| 2008/0180266 A1* | 7/2008 | Ono | H04N 1/00127 340/661 |
| 2009/0080625 A1* | 3/2009 | Ogawa | H04M 1/82 379/90.01 |
| 2009/0129558 A1* | 5/2009 | Ishizu | H04M 1/82 379/22.03 |
| 2011/0216887 A1* | 9/2011 | Nomura | H04M 1/00 379/32.01 |
| 2013/0083910 A1* | 4/2013 | Baba | H04M 11/007 379/100.01 |
| 2015/0036809 A1* | 2/2015 | Maruyama | H04N 1/32728 379/100.01 |
| 2016/0036596 A1* | 2/2016 | Fukushima | H04L 12/12 370/241 |

\* cited by examiner

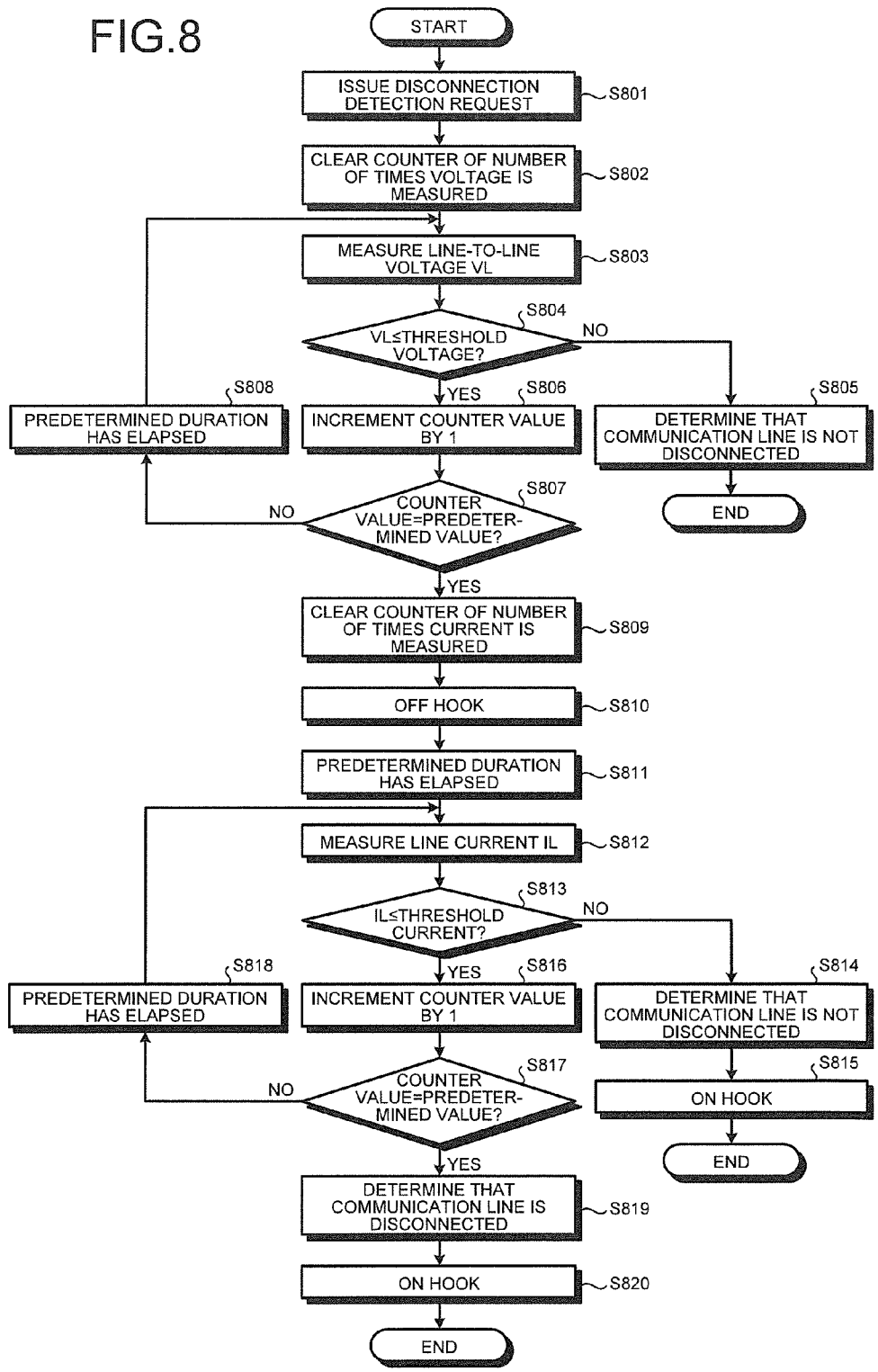

COMMUNICATION CONTROL DEVICE, COMMUNICATION APPARATUS, IMAGE FORMING APPARATUS, AND COMPUTER-READABLE RECORDING MEDIUM

CROSS-REFERENCE TO RELATED APPLICATIONS

The present application claims priority under 35 U.S.C. §119 to Japanese Patent Application No. 2015-096579 filed in Japan on May 11, 2015. The contents of which are incorporated herein by reference in their entirety.

BACKGROUND OF THE INVENTION

1. Field of the Invention

The present invention relates generally to a communication control device, a communication apparatus, an image forming apparatus, and a computer-readable recording medium with control program instructions for the communication control device.

2. Description of the Related Art

In recent years, image processing apparatuses used for information digitization and image forming apparatuses used to output digitized information have become indispensable equipment. Such an image processing apparatus and an image forming apparatus are each configured, in many cases, as a multifunction peripheral (MFP) usable as a printer, a facsimile, a scanner, and a copier.

Such an MFP is generally connected to a communication network, such as a public switched telephone network and a facsimile communication network, via a communication line, such as a telephone line, and transmits and receives facsimile data to and from another MFP over the communication line. A technique for detecting disconnection of the communication line of the MFP is proposed and already known. An example of the technique is disclosed in Japanese Laid-open Patent Publication No. 08-070345.

Japanese Laid-open Patent Publication No. 08-070345 discloses a disconnection detection circuit that, while in an on-hook condition, measures a voltage across terminals of the communication line and detects that the communication line is disconnected when the voltage is lower than a predetermined voltage but, while in an off-hook condition, measures a current flowing through the terminals of the communication line and detects that the communication line is disconnected when the measured current is zero.

However, the disconnection detection circuit disclosed in Japanese Laid-open Patent Publication No. 08-070345 has a problem that, when connected to a communication line where the voltage across terminals of the communication line is low in the on-hook condition, the disconnection detection circuit can falsely detect that the communication line is disconnected. This problem can occur not only in an MFP but also in a communication apparatus, such as a facsimile-only apparatus and a telephone, as well.

Therefore, there is a need to increase reliability in detection of communication line's disconnection.

SUMMARY OF THE INVENTION

It is an object of the present invention to at least partially solve the problems in the conventional technology.

According to exemplary embodiments of the present invention, there is provided a communication control device for controlling communication performed over a communication line, the communication control device comprising: a voltage-value acquirer configured to acquire a voltage value of a line-to-line voltage of the communication line in an on-hook state; a first determiner configured to determine whether or not the acquired voltage value is continuously equal to or lower than a threshold voltage for a first predetermined duration; a current-value acquirer configured to acquire a current value of a line current flowing through the communication line in an off-hook state when a determination that the voltage value is continuously equal to or lower than the threshold voltage for the first predetermined duration is made; a second determiner configured to determine whether or not the acquired current value is continuously equal to or smaller than a threshold current for a second predetermined duration; and a disconnection determiner configured to determine that the communication line is disconnected when a determination that the current value is continuously equal to or smaller than the threshold current for the second predetermined duration is made.

Exemplary embodiments of the present invention also provide a communication apparatus comprising the above-described communication control device.

Exemplary embodiments of the present invention also provide an image forming apparatus comprising the above-described communication control device.

Exemplary embodiments of the present invention also provide a non-transitory computer-readable recording medium having control program instructions that, when executed by a communication control device for controlling communication performed over a communication line, cause the communication control device to perform: acquiring a voltage value of a line-to-line voltage of the communication line in an on-hook state; determining whether or not the acquired voltage value is continuously equal to or lower than a threshold voltage for a first predetermined duration; acquiring a current value of a line current flowing through the communication line in an off-hook state when a determination that the voltage value is continuously equal to or lower than the threshold voltage for the first predetermined duration is made; determining whether or not the acquired current value is continuously equal to or lower than a threshold current for a second predetermined duration; and determining that the communication line is disconnected when a determination that the current value is continuously equal to or smaller than the threshold current for the second predetermined duration is made.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart for describing a process, performed by the MFP according to the embodiment, for detecting whether or not a communication line is disconnected.

DETAILED DESCRIPTION OF THE PREFERRED EMBODIMENTS

An exemplary embodiment of the present invention is described in detail below with reference to the accompanying drawings. The present embodiment is described through an example of an MFP (multifunction peripheral) connected to a communication network, such as a public switched telephone network and a facsimile communication network, via a communication line, such as a telephone line, to transmit and receive facsimile data to and from another MFP over the communication line.

The MFP according to the present embodiment detects whether or not the communication line is disconnected as follows. The MFP performs an off-hook operation only when a value of a voltage applied between lines of the communication line (hereinafter, "line-to-line voltage") is continuously equal to or lower than a threshold voltage for a predetermined duration in an on-hook state. The MFP according to the present embodiment determines that the communication line is disconnected when a value of electric current flowing through the communication line (hereinafter, "line current") is continuously equal to or smaller than a threshold current for a predetermined duration in an off-hook state.

When configured in this way, the MFP according to the present embodiment can reduce, even if the MFP is connected to a communication line where the line-to-line voltage in the on-hook state is low, false detection of falsely detecting that the communication line is disconnected. Therefore, the MFP according to the present embodiment can not only avoid unnecessary off-hook operation but also increase reliability in detection of communication line's disconnection.

Figure 1:
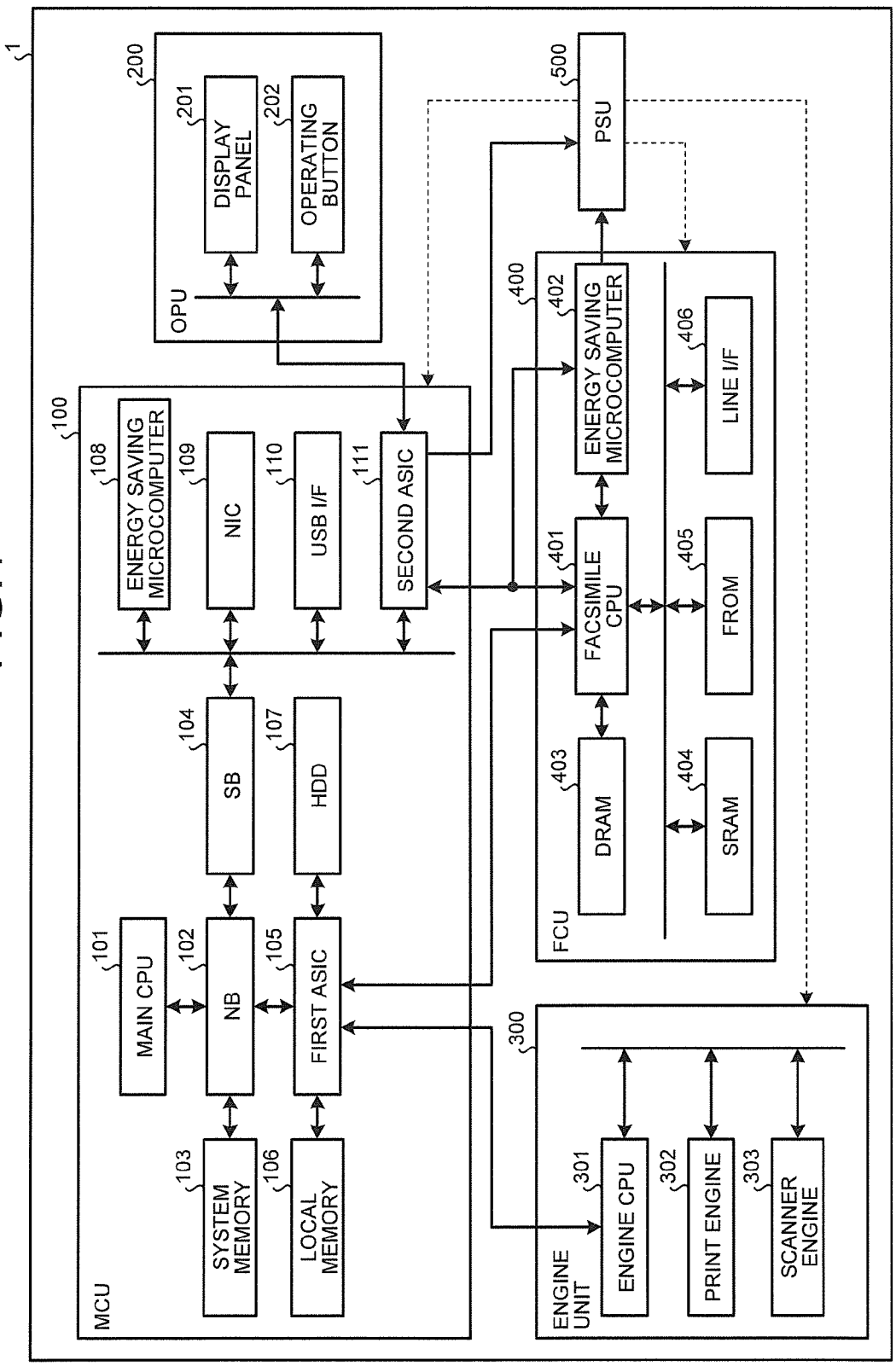
FIG. 1 is a diagram illustrating an example of an overall configuration of an MFP according to an embodiment of the present invention.
Figure 2:
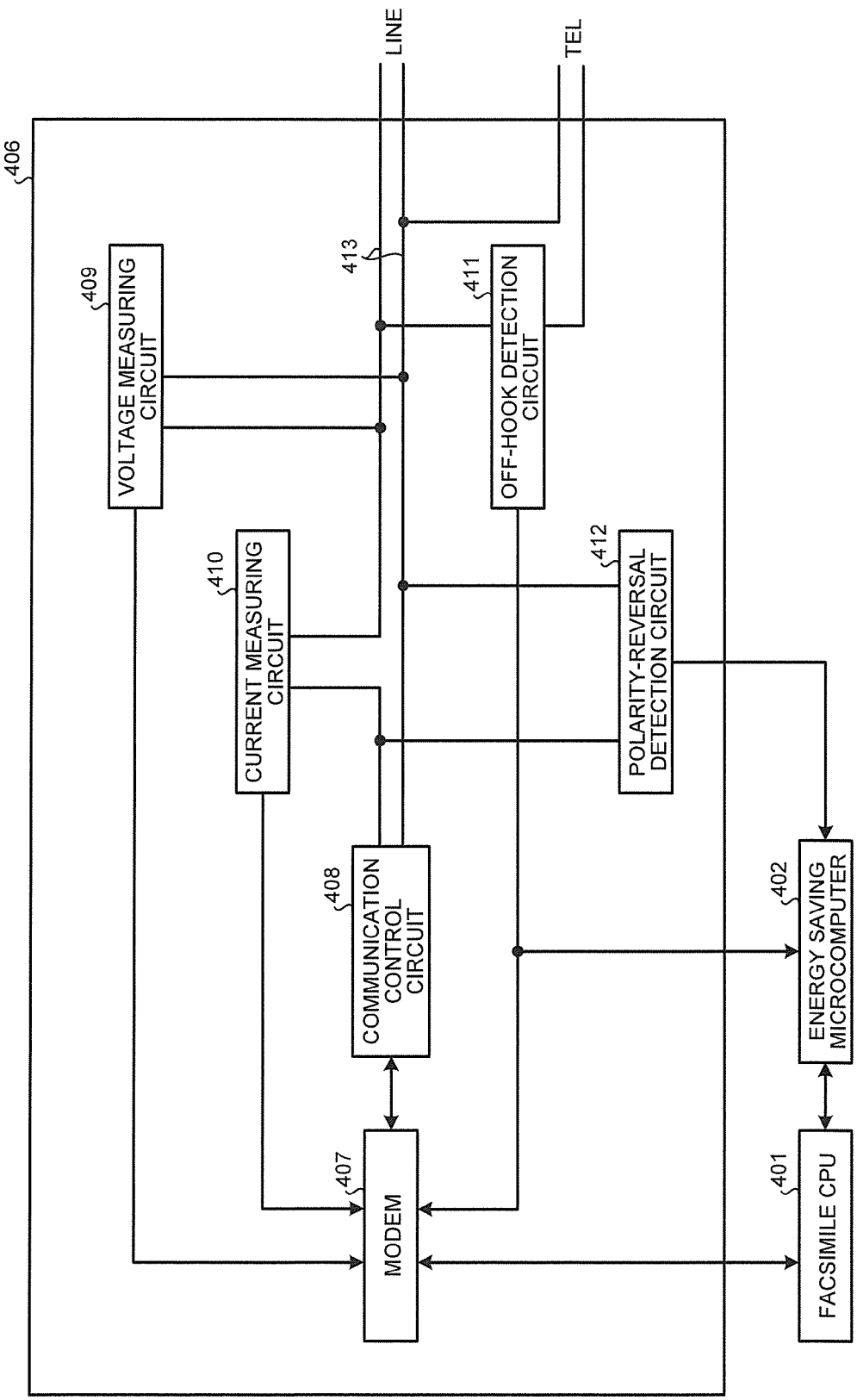
FIG. 2 is a block diagram schematically illustrating a hardware architecture of a line I/F of the MFP according to the embodiment of the present invention.

A hardware architecture of an MFP 1 according to the present embodiment is described below with reference to FIGS. 1 and 2. FIG. 1 is a diagram illustrating an example of an overall configuration of the MFP 1 according to the present embodiment. FIG. 2 is a block diagram schematically illustrating a hardware architecture of a line I/F 406 of the MFP 1 according to the present embodiment. In FIGS. 1 and 2, flows of electronic signals are indicated by solid-line arrows, while flows of electric power are indicated by dashed-line arrows.

As illustrated in FIG. 1, the MFP 1 according to the present embodiment includes an MCU (main control unit) 100, an OPU (operation panel unit) 200, an engine unit 300, an FCU (facsimile control unit) 400, and a PSU (power supply unit) 500.

The PSU 500 is connected to an AC (alternating current) power supply, which may be a commercial or mains power supply, thereby supplying electric power to parts of the MFP 1.

As illustrated in FIG. 1, the MCU 100 includes a main CPU (central processing unit) 101, an NB (north bridge) 102, a system memory 103, an SB (south bridge) 104, a first ASIC (application specific integrated circuit) 105, a local memory 106, an HDD (hard disk drive) 107, an energy saving microcomputer 108, an NIC (network interface card) 109, a USB (universal serial bus) I/F 110, and a second ASIC 111 and controls operations of the entire MFP 1.

The main CPU 101 is a computing unit and controls operations of the entire MFP 1. The system memory 103 is a volatile storage medium where information can be written and read at a high speed. The system memory 103 is connected to the main CPU 101 via the NB 102 and used as a work area in information processing performed by the main CPU 101.

The first ASIC 105 includes a general-purpose interface, such as a PCIe (peripheral component interconnect express) interface, and is connected to the main CPU 101 via the NB 102. The first ASIC 105 exchanges data with the MCU 100 and the engine unit 300 across the interface, such as the PCIe interface, under control of the main CPU 101. The first ASIC 105 also exchanges data with the main CPU 101, the local memory 106, and the HDD 107.

The local memory 106 is used as a data storage area when data is exchanged between the main CPU 101 and the first ASIC 105. The HDD 107 is a non-volatile storage medium where information can be written and read and stores various data including image data and various program instructions (hereinafter, "programs") including an OS (operating system), various control programs, and application programs.

The energy saving microcomputer 108 is connected to the NB 102 via the SB 104 and a bus and operates continuously even in a power-off state so long as the PSU 500 is connected to the AC power supply, which is the commercial or mains power supply, to control recovery of the MFP 1 from the power-off condition and transition to the power-off condition.

The NIC 109 is an interface connected to the NB 102 via the SB 104 and the bus to connect, when a LAN (local area network) cable is connected to the NIC 109, the MFP 1 to a network, which may be the Internet or a LAN.

The USB I/F 110 is an input/output interface compliant with a standard, such as USB 1.x, USB 2.0, and USB 3.0, and connected to the NB 102 via the SB 104 and the bus to connect, when a USB device is connected to the USB I/F 110, the USB device to the MFP 1.

The MFP 1 receives a request for performing a print job from a host apparatus, such as an information processing apparatus, via the NIC 109 or the USB I/F 110 and performs an image forming operation in response thereto. The main CPU 101 can detect whether or not wireless LAN communication or a LAN cable is connected to the NIC 109 and whether or not a USB device is connected to the USB I/F 110 or, in short, whether or not an external device is connected to the MFP 1. In the present embodiment, the main CPU 101 thus functions as "connection determiner".

The second ASIC 111 includes a general-purpose interface, such as a PCIe interface, and a dedicated control signal line, and is connected to the NB 102 via the SB 104 and the bus. The second ASIC 111 exchanges data with the MCU 100 and the OPU 200 and exchanges data with the MCU 100 and the FCU 400 across the interface, such as the PCIe interface, under control of the main CPU 101.

The second ASIC 111 further includes a sub CPU that assists the main CPU 101. When a transition to an STR (suspend to RAM) mode is made, the second ASIC 111 stops supplying power to most parts of the MCU 100 including the main CPU 101 and controls operations of the entire MFP 1 in lieu of the main CPU 101 to increase energy-saving efficiency.

The MCU 100 further includes an interface, across which the MFP 1 communicates with another apparatus, adhering to a standard, such as the Ethernet (registered trademark), USB (universal serial bus), Bluetooth (registered trademark), Wi-Fi (wireless fidelity) (registered trademark), FeliCa (registered trademark), PCIe (peripheral component interconnect express), and IEEE (the Institute of Electrical and Electronics Engineers) standards.

As illustrated in FIG. 1, the OPU 200 includes a display panel 201 and an operating button 202 to accept an input entered by a user and display a message directed to a user(s).

The display panel 201 is not only an output interface that visually displays a condition of the MFP 1 but also an input interface serving as a touch panel from which a user directly operates the MFP 1 or enters information to the MFP 1. The display panel 201 can be embodied as a display device, such as an LCD (liquid crystal display), or an output device, such as an LED (light emitting diode).

The operating button 202 is an input interface through which a user directly operates the MFP 1 or enters information to the MFP 1. The operating button 202 can be embodied as an input device, such as a keyboard, a mouse, and an input button.

As illustrated in FIG. 1, the engine unit 300 includes an engine CPU 301, a print engine 302, and a scanner engine 303 and performs an original-document reading operation and an image forming operation in accordance with a user's operation performed on the OPU 200 or a request for performing a print job fed from a host apparatus. The engine CPU 301 controls operations of the entire engine unit 300.

The print engine 302 is an image forming unit that forms an image by performing an image output operation. The print engine 302 performs the image output operation in accordance with image data obtained by the scanner engine 303, facsimile data received by the FCU 400, or print job data received via the NIC 109 or the USB I/F 110. As a specific embodiment example of the print engine 302, an inkjet image forming mechanism, an electrophotographic image forming mechanism, or the like can be used.

The scanner engine 303 is a document reading unit including an optoelectronic transducer that converts optical information into an electrical signal. The scanner engine 303 generates image data by optically scanning and reading in an original document automatically conveyed from a document table by an automatic document feeder or an original document placed on an exposure glass.

As illustrated in FIG. 1, the FCU 400 includes a facsimile CPU 401, an energy saving microcomputer 402, a DRAM (dynamic random access memory) 403, an SRAM (static random access memory) 404, an FROM (flash read only memory) 405, and the line I/F 406 and controls transmission and reception of facsimile data to and from another MFP under control of the MCU 100. In the present embodiment, the MCU 100 and the FCU 400 thus function as "communication control device".

The facsimile CPU 401 controls operations of the entire FCU 400. To increase energy-saving efficiency, the energy saving microcomputer 402 stops power supply to most parts of the FCU 400 including the facsimile CPU 401 when a transition to the STR mode is made and, when a return factor is detected, resumes supplying power to parts of the FCU 400 to thereby control recovery from the STR mode.

The DRAM 403 is used as a temporary data storage area. The SRAM 404 is used as a consecutive data storage area. The FROM 405 stores application programs including a startup program and a communication control program.

As illustrated in FIG. 2, the line I/F 406 includes a modem 407, a communication control circuit 408, a voltage measuring circuit 409, a current measuring circuit 410, an off-hook detection circuit 411, and a polarity-reversal detection circuit 412. The line I/F 406 is an interface to be connected to a communication line 413, such as a telephone line, to connect the MFP 1 to a communication network, such as a public switched telephone network and a facsimile communication network. The line I/F 406 further includes, for example, a loudspeaker drive circuit for driving a loudspeaker.

The modem 407 generates an analog signal by modulating facsimile data and passes the analog signal to the communication control circuit 408. The modem 407 also generates facsimile data by demodulating an analog signal transmitted from the communication control circuit 408.

The communication control circuit 408 detects a ringing signal from the communication line 413, transmits an analog signal received over the communication line 413 to the modem 407, and transmits, over the communication line 413, an analog signal passed from the modem 407.

The voltage measuring circuit 409 measures a line-to-line voltage VL of the communication line 413 in an on-hook state. The current measuring circuit 410 measures a line current IL of the communication line 413 in an off-hook state. Each of the communication control circuit 408, the voltage measuring circuit 409, and the current measuring circuit 410 may be embodied as a silicon-based circuit control device, such as an SiDAA (silicon data access arrangement) (SSD (solid state disk)) and an SiDAA (LSD)

The off-hook detection circuit 411 detects that an external telephone has entered the off-hook state. The polarity-reversal detection circuit 412 detects polarity reversal in the communication line 413 and a ringing signal from the communication line 413.

Thus, the MFP 1 according to the present embodiment is an MFP (multifunction peripheral) having functions as an image processing apparatus and an image forming apparatus and is usable as a printer, a facsimile, a scanner, and a copier.

In such a hardware architecture described above, a program stored in a storage medium, such as the HDD 107 and the FROM 405, is loaded into the system memory 103, the local memory 106, the DRAM 403, or the SRAM 404. The main CPU 101 or the facsimile CPU 401 executes computations in accordance with the loaded program, thereby configuring software controllers. Functional blocks that perform the functions of the MFP 1 according to the present embodiment are implemented in a combination of the software controllers implemented as described above and the hardware.

Figure 3:
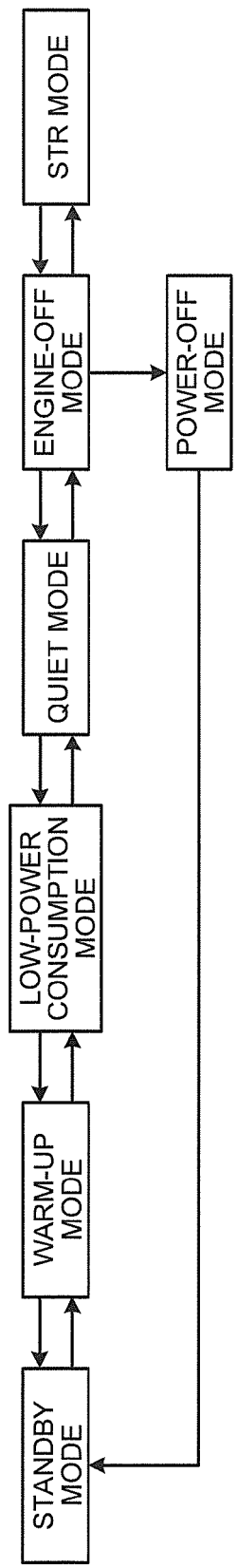
FIG. 3 is a mode transition diagram illustrating an example of operating modes where the MFP according to the embodiment of the present invention can be placed.

Operating modes where the MFP 1 according to the present embodiment can be placed are described below with reference to FIG. 3. FIG. 3 is a mode transition diagram illustrating an example of the operating modes where the MFP 1 according to the present embodiment can be placed.

As illustrated in FIG. 3, the MFP 1 according to the present embodiment can be placed in any one of operating modes, which are a standby mode, a warm-up mode, a low-power consumption mode, a quiet mode, an engine-off mode, the STR mode, and a power-off mode.

The MFP 1 is configured to save energy by making a transition from one operating mode to another at a specific time or when an idling duration of the MFP 1 in the standby mode exceeds a preset duration. The transition between the operating modes is triggered by transmission of a power-supply control signal from the MCU 100 to the PSU 500. In the present embodiment, the MCU 100 thus functions as "operating-mode transition controller".

Power supply states of the MFP 1 according to the present embodiment in the respective operating modes are described below with reference to FIGS. 4 to 7.

Figure 4:
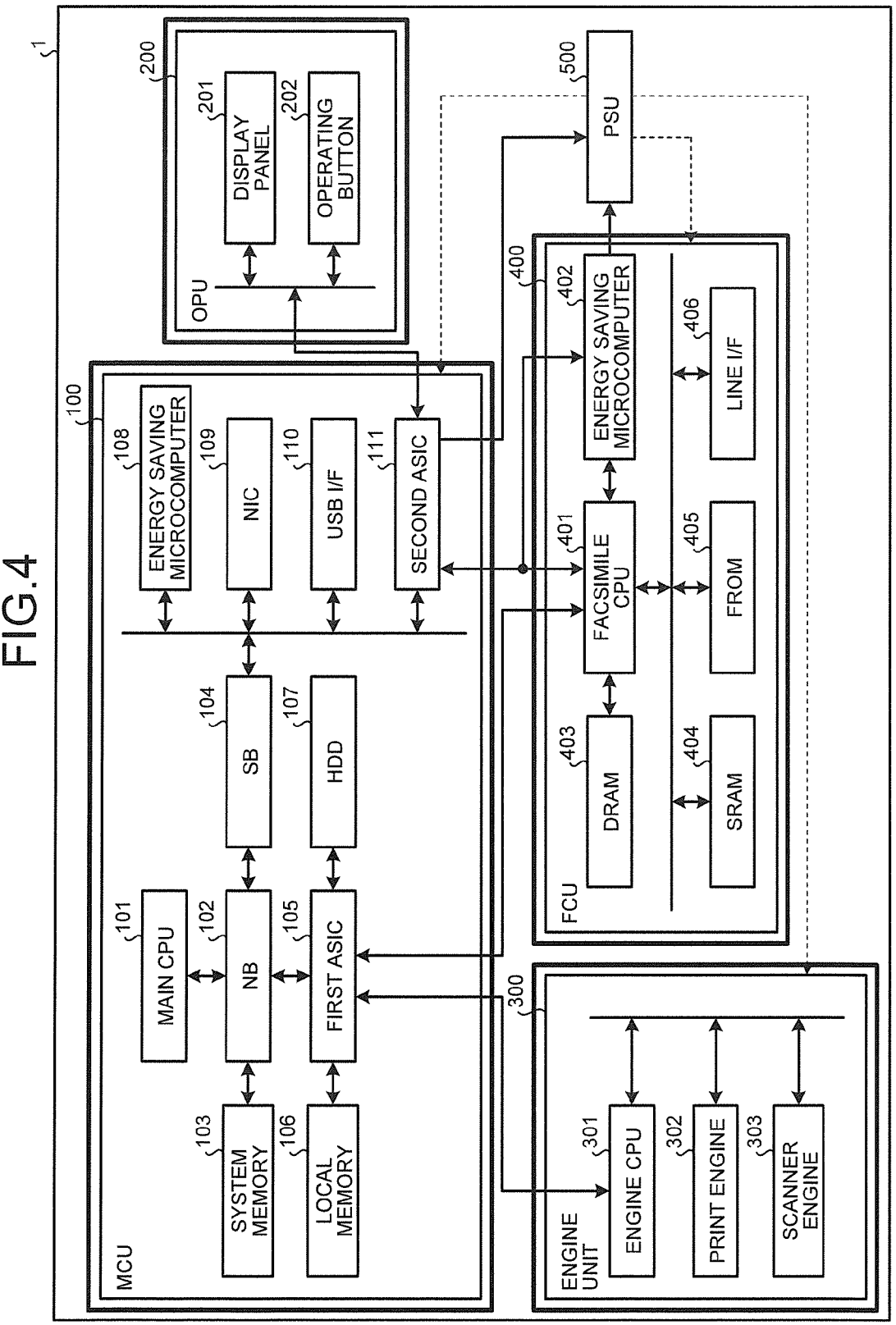
FIG. 4 is a diagram for describing a power supply state of the MFP according to the embodiment of the present invention in a standby mode.
Figure 5:
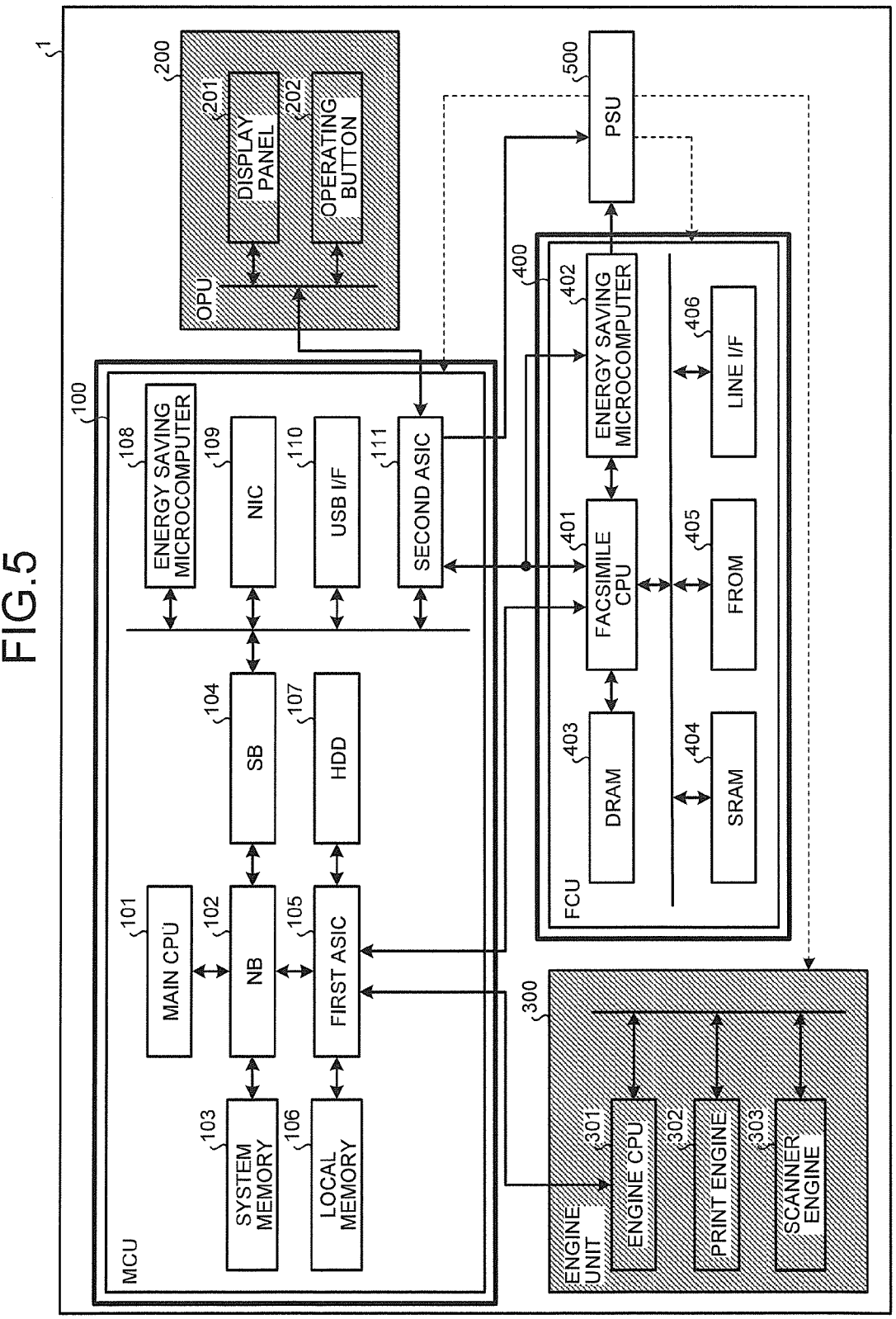
FIG. 5 is a diagram for describing a power supply state of the MFP according to the embodiment of the present invention in an engine-off mode.
Figure 6:
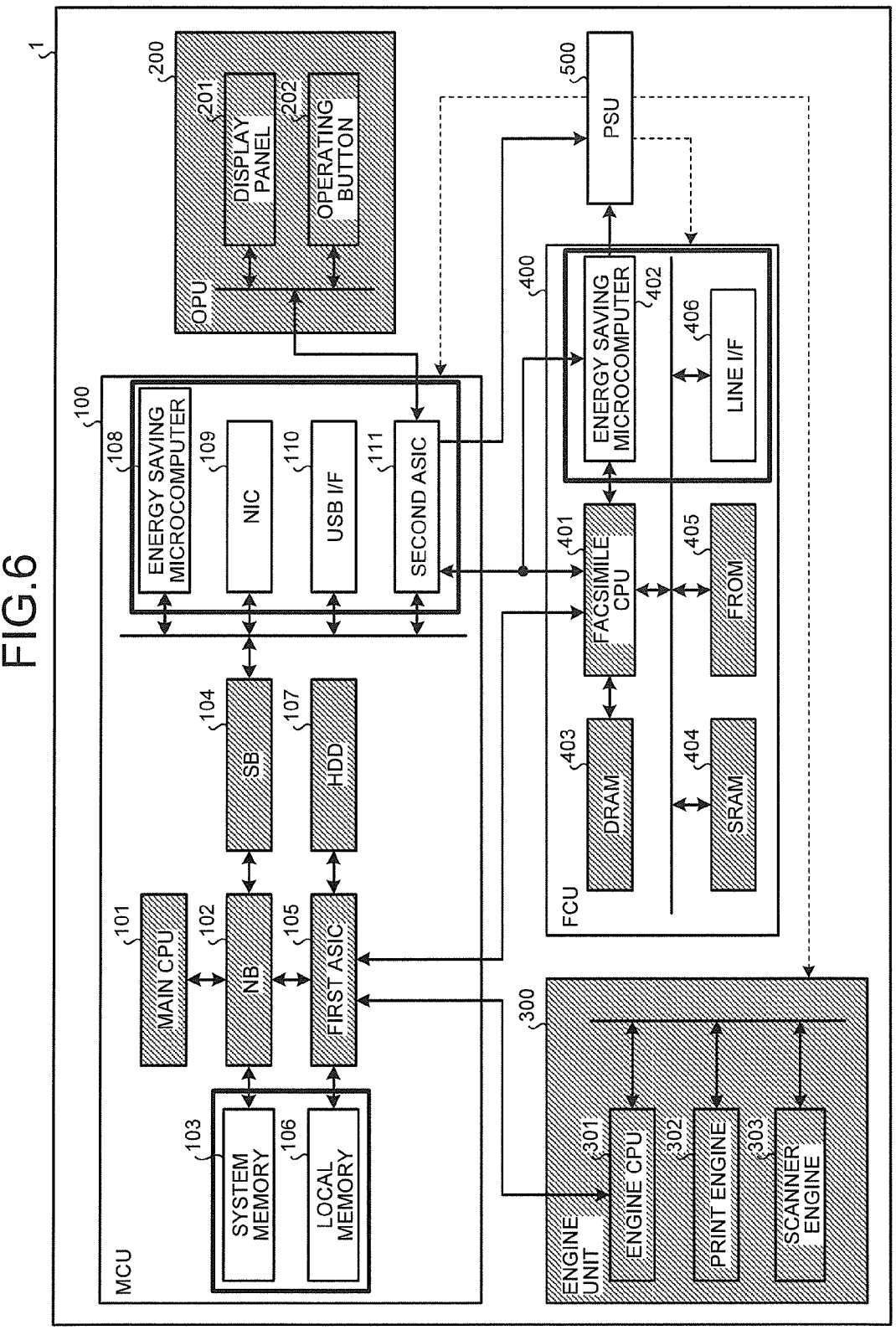
FIG. 6 is a diagram for describing a power supply state of the MFP according to the embodiment of the present invention in an STR mode.
Figure 7:
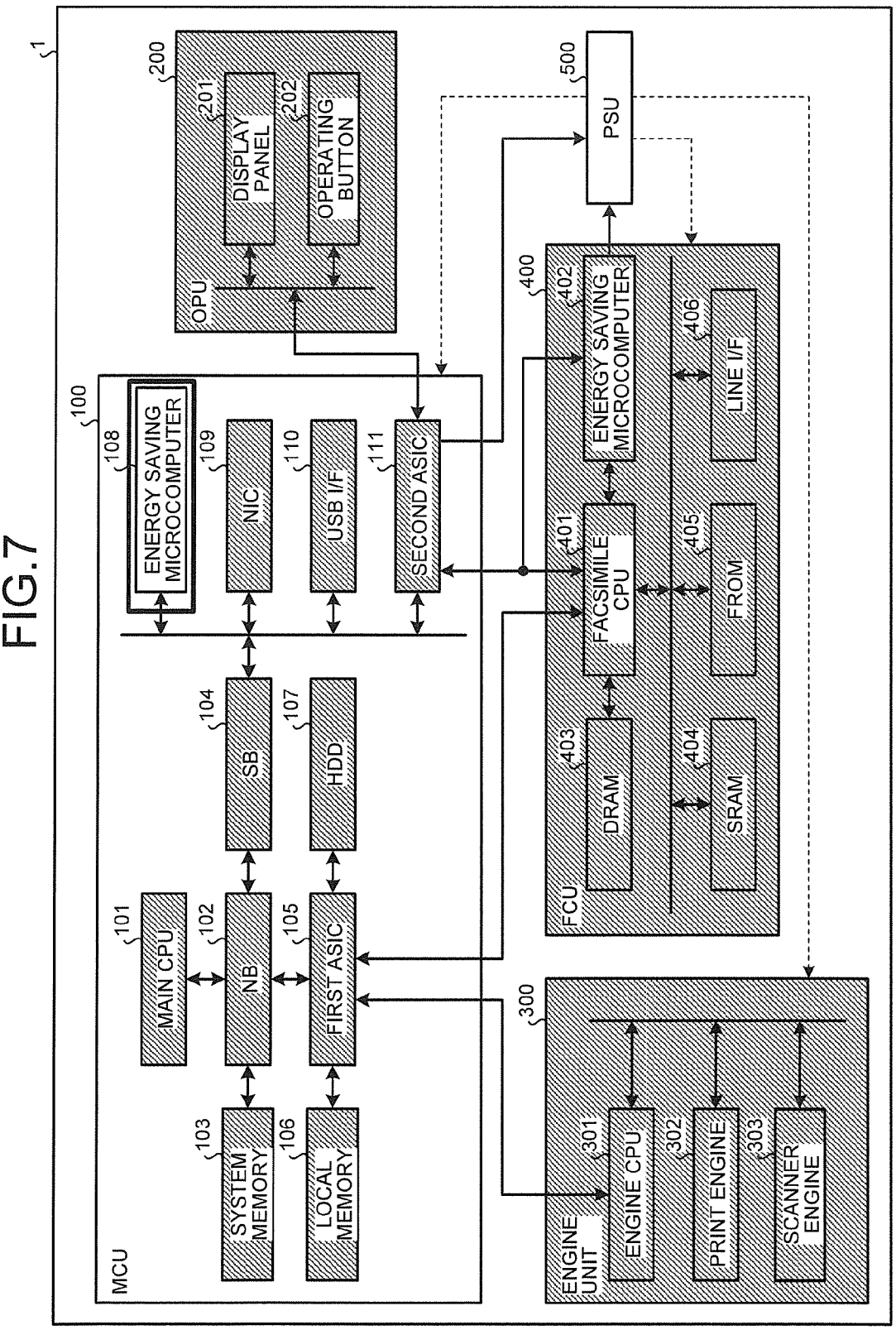
FIG. 7 is a diagram for describing a power supply state of the MFP according to the embodiment of the present invention in a power-off mode.

FIG. 4 is a diagram for describing a power supply state of the MFP 1 according to the present embodiment in the standby mode. FIG. 5 is a diagram for describing a power supply state of the MFP 1 according to the present embodiment in the engine-off mode. FIG. 6 is a diagram for describing a power supply state of the MFP 1 according to the present embodiment in the STR mode. FIG. 7 is a diagram for describing a power supply state of the MFP 1 according to the present embodiment in the power-off mode.

In FIGS. 4 to 7, each area in a thick-line frame indicates a zone supplied with electric power, while each hatched area (shaded with parallel lines) indicates a zone not supplied with electric power.

As illustrated in FIG. 4, when the MFP 1 according to the present embodiment is in the standby mode, power is supplied to all parts of the MFP 1.

As illustrated in FIG. 5, when the MFP 1 according to the present embodiment is in the engine-off mode, power is supplied to the MCU 100 and the FCU 400 but not to the OPU 200 and the engine unit 300. Thus, the MFP 1 according to the present embodiment is configured to save energy in the engine-off mode by stopping power supply to certain parts of the MFP 1.

As illustrated in FIG. 6, when the MFP 1 according to the present embodiment is in the STR mode, power is supplied to a portion of the MCU 100 and a portion of the FCU 400 or, more specifically, the system memory 103, the local memory 106, the energy saving microcomputer 108, the NIC 109, the USB 110, and the second ASIC 111 of the MCU 100 and the energy saving microcomputer 402 and the line I/F 406 of the FCU 400, but not to the other parts. Thus, the MFP 1 according to the present embodiment is configured to save energy in the STR mode by stopping power supply to certain parts of the MFP 1.

As illustrated in FIG. 7, when the MFP 1 according to the present embodiment is in the power-off mode, power is supplied only to the energy saving microcomputer 108 of the MCU 100 but not to the other parts. Thus, the MFP 1 according to the present embodiment achieves power consumption of 0.5 W in the power-off mode.

Accordingly, the MFP 1 according to the present embodiment can conform to a requirement on off-mode losses imposed by Lot 6, which is a European standard, or, more specifically, a requirement that off-mode loss of a device in a power-off mode should be lower than 0.5 W.

A process performed by the MFP 1 according to the present embodiment for detecting whether or not the communication line 413 is disconnected is described below with reference to FIG. 8. FIG. 8 is a flowchart for describing the process, performed by the MFP 1 according to the present embodiment, for detecting whether or not the communication line 413 is disconnected.

The process described below with reference to FIG. 8 is executed by the facsimile CPU 401 by loading the communication control program stored in the FROM 405 into the DRAM 403 or the SRAM 404 and performing computations in accordance with the loaded communication control program.

As illustrated in FIG. 8, to detect whether or not the communication line 413 is disconnected, the MFP 1 according to the present embodiment issues, to the FCU 400, a disconnection detection request requesting the FCU 400 to detect whether or not the communication line 413 is disconnected at regular intervals (step S801).

Upon receiving the disconnection detection request from the MCU 100, the facsimile CPU 401 clears a counter value of a voltage measurement counter, which counts the number of times the line-to-line voltage VL is measured by the voltage measuring circuit 409 (step S802).

The facsimile CPU 401 causes the voltage measuring circuit 409 to measure the line-to-line voltage VL (step S803) and determines which is higher, the measured line-to-line voltage VL or a threshold voltage (step S804). In the present embodiment, the facsimile CPU 401 thus functions as "voltage-value acquirer" and "first determiner".

In the MFP 1 according to the present embodiment, the threshold voltage may be determined in advance or, alternatively, the MCU 100 may be configured to be capable of changing the setting of the threshold voltage in accordance with an operation performed by a user or an administrator on the OPU 200 or an instruction fed from a host apparatus. In the first embodiment, the MCU 100 thus functions as "setting changer". By virtue of being configured in this way, the MFP 1 according to the present embodiment can adapt even to a communication line suffering from much noise or a poor line condition, thereby increasing reliability in disconnection detection of the communication line 413.

If the facsimile CPU 401 determines that the line-to-line voltage VL is higher than the threshold voltage in the determination at S804 (NO at step S804), the facsimile CPU 401 determines that the communication line 413 is not disconnected and notifies the MCU 100 of a result of the determination (step S805). The process for detecting whether or not the communication line 413 is disconnected performed by the MFP 1 according to the present embodiment then ends.

If the facsimile CPU 401 determines that the line-to-line voltage VL is equal to or lower than the threshold voltage in the determination at S804 (YES at step S804), the facsimile CPU 401 increments the counter value of the voltage measurement counter by one (step S806).

The facsimile CPU 401 determines which is larger, the counter value of the voltage measurement counter or a predetermined value, thereby determining whether or not a duration, over which the line-to-line voltage VL is equal to or lower than the threshold voltage, has reached a predetermined duration (step S807). This predetermined duration is thus used as "first predetermined duration", a determination criterion for disconnection detection.

In the MFP 1 according to the present embodiment, the predetermined value may be determined in advance or, alternatively, the MCU 100 may be configured to be capable of changing the setting of the predetermined value in accordance with an operation performed by a user or an administrator on the OPU 200 or an instruction fed from a host apparatus. By virtue of being configured in this way, the MFP 1 according to the present embodiment can adapt even to a communication line suffering from much noise or a poor line condition, thereby increasing reliability in disconnection detection of the communication line 413.

If the facsimile CPU 401 determines that the counter value is smaller than the predetermined value or, in other words, that the duration, over which the line-to-line voltage VL is equal to or lower than the threshold voltage, has not reached the predetermined duration in the determination at S807 (NO at step S807), after a lapse of a predetermined duration (e.g., after a lapse of 20 ms (milliseconds)) (step S808), the facsimile CPU 401 performs processing at step S803 and following steps.

In the MFP 1 according to the present embodiment, the predetermined duration may be determined in advance or, alternatively, the MCU 100 may be configured to be capable of changing the setting of the predetermined duration in accordance with an operation performed by a user or an administrator on the OPU 200 or an instruction fed from a host apparatus.

If the facsimile CPU 401 determines that the counter value is equal to or greater than the predetermined value or, in other words, that the duration, over which the line-to-line voltage VL is equal to or lower than the threshold voltage, has reached the predetermined duration in the determination at step S807 (YES at step S807), the facsimile CPU 401 clears a counter value of a current measurement counter, which counts the number of times the line current IL is measured by the current measuring circuit 410 (step S809).

The facsimile CPU 401 performs an off-hook operation (step S810). After a lapse of a predetermined duration (e.g., after a lapse of 500 ms) from entering the off-hook state (step S811), the facsimile CPU 401 causes the current measuring circuit 410 to measure the line current IL (step S812), and determines which is larger, the measured line current IL or a threshold current (step S813). In the present embodiment, this predetermined duration is thus used as "third predetermined duration", a determination criterion for disconnection detection; the facsimile CPU 401 functions as "current-value acquirer" and "second determiner".

In the MFP 1 according to the present embodiment, the predetermined duration may be determined in advance or, alternatively, the MCU 100 may be configured to be capable of changing the setting of the predetermined duration in accordance with an operation performed by a user or an administrator on the OPU 200 or an instruction fed from a host apparatus. By virtue of being configured in this way, the MFP 1 according to the present embodiment can adapt even to a telephone switchboard that is slow in detecting the off-hook state, thereby increasing reliability in disconnection detection of the communication line 413.

In the MFP 1 according to the present embodiment, the threshold current may be determined in advance or, alternatively, the MCU 100 may be configured to be capable of changing the setting of the threshold current in accordance with an operation performed by a user or an administrator on the OPU 200 or an instruction fed from a host apparatus. By virtue of being configured in this way, the MFP 1 according to the present embodiment can adapt even to a communication line suffering from much noise or a poor line condition, thereby increasing reliability in disconnection detection of the communication line 413.

If the facsimile CPU 401 determines that the line current IL is larger than the threshold current in the determination at S813 (NO at step S813), the facsimile CPU 401 determines that the communication line 413 is not disconnected, notifies the MCU 100 of a result of the determination (step S814), and causes a return to the on-hook state (step S815). The process for detecting whether or not the communication line 413 is disconnected performed by the MFP 1 according to the present embodiment then ends.

If the facsimile CPU 401 determines that the line current IL is equal to or smaller than the threshold current in the determination at step S813 (YES at step S813), the facsimile CPU 401 increments the counter value of the current measurement counter by one (step S816).

The facsimile CPU 401 determines which is larger, the counter value of the current measurement counter or a predetermined value, thereby determining whether or not a duration, over which the line current IL is equal to or smaller than the threshold current, has reached a predetermined duration (step S817). This predetermined duration is thus used as "second predetermined duration", a determination criterion for disconnection detection.

In the MFP 1 according to the present embodiment, the predetermined value may be determined in advance or, alternatively, the MCU 100 may be configured to be capable of changing the setting of the predetermined value in accordance with an operation performed by a user or an administrator on the OPU 200 or an instruction fed from a host apparatus. By virtue of being configured in this way, the MFP 1 according to the present embodiment can adapt even to a communication line suffering from much noise or a poor line condition, thereby increasing reliability in disconnection detection of the communication line 413.

If the facsimile CPU 401 determines that the counter value is smaller than the predetermined value or, in other words, that the duration, over which the line current IL is equal to or smaller than the threshold current, has not reached the predetermined duration in the determination at S817 (NO at step S817), after a lapse of a predetermined duration (e.g., after a lapse of 20 ms) (step S818), the facsimile CPU 401 performs processing at step S812 and following steps.

In the MFP 1 according to the present embodiment, the predetermined duration may be determined in advance or, alternatively, the MCU 100 may be configured to be capable of changing the setting of the predetermined duration in accordance with an operation performed by a user or an administrator on the OPU 200 or an instruction fed from a host apparatus.

If the facsimile CPU 401 determines that the counter value is equal to or greater than the predetermined value or, in other words, that the duration, over which the line current IL is equal to or smaller than the threshold current, has reached the predetermined duration in the determination at step S817 (YES at step S817), the facsimile CPU 401 determines that the communication line 413 is disconnected, notifies the MCU 100 of a result of the determination (step S819), and causes a return to the on-hook state (step S820). In the present embodiment, the facsimile CPU 401 thus functions as "disconnection determiner". The process for detecting whether or not the communication line 413 is disconnected performed by the MFP 1 according to the present embodiment then ends.

The MFP 1 according to the present embodiment may be configured as follows. If it is determined that the communication line 413 is disconnected, that a LAN cable is not connected to the NIC 109, and that no USB device is connected to the USB I/F 110, the MCU 100 causes a transition of the MFP 1 to the power-off mode.

When configured in this way, the MFP 1 according to the present embodiment can prevent wasting energy uselessly in a condition where the MFP 1 is not connected to another device, a network, or a communication network, thereby achieving energy saving. Furthermore, when configured in this way, the MFP 1 according to the present embodiment can conform to the requirement on off-mode losses imposed by Lot 6, which is a European standard.

The MFP 1 according to the present embodiment may be configured to issue a disconnection detection request at occurrence of disconnection of the communication line 413 to conform to the requirement on off-mode losses imposed by Lot 6, which is a European standard, only when the MFP 1 is an MFP to be shipped to Europe.

As described above, when detecting whether or not the communication line is disconnected, the MFP 1 according to the present embodiment performs the off-hook operation only when the line-to-line voltage of the communication line is continuously equal to or lower than the threshold voltage for the predetermined duration in the on-hook state. The MFP 1 according to the present embodiment determines that the communication line is disconnected when the line current of the communication line is continuously equal to or smaller than the threshold current for the predetermined duration in the off-hook state.

By virtue of being configured in this way, the MFP 1 according to the present embodiment can reduce, even when the MFP 1 is connected to a communication line where the line-to-line voltage in the on-hook state is low, false detection of falsely detecting that the communication line is disconnected. Therefore, the MFP 1 according to the present embodiment can not only avoid unnecessary off-hook operation but also increase reliability in detection of communication line's disconnection.

Although the present embodiment has been described through an example of an MFP, the present embodiment is applicable to a communication apparatus, such as a facsimile-only apparatus and a telephone, as well.

According to an aspect of the present invention, reliability in detection of communication line's disconnection can be increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication control device for controlling communication performed over a communication line, the communication control device comprising:
  a voltage-value acquirer configured to acquire a voltage value of a line-to-line voltage of the communication line in an on-hook state;
  a first determiner configured to determine whether the acquired voltage value has been continuously equal to or lower than a threshold voltage for a first predetermined duration;
  a controller to control operations of the communication control device, the controller controlling the communication control device to perform an off-hook operation when the first determiner determines that the voltage value has been continuously equal to or lower than the threshold voltage for the first predetermined duration;
  a current-value acquirer configured to acquire a current value of a line current flowing through the communication line in an off-hook state in a case that the first determiner determines that the voltage value has been continuously equal to or lower than the threshold voltage for the first predetermined duration;
  a second determiner configured to determine whether the acquired current value has been continuously equal to or lower than a threshold current for a second predetermined duration; and
  a disconnection determiner configured to determine that the communication line has been disconnected when the second determiner determines that the current value has been continuously equal to or lower than the threshold current for the second predetermined duration.

2. The communication control device according to claim 1, further comprising a setting changer configured to change settings of at least any one of the first predetermined duration, the second predetermined duration, the threshold voltage, and the threshold current.

3. The communication control device according to claim 1, wherein the current-value acquirer acquires a current value of a line current flowing through the communication line in the off-hook state after a lapse of a third predetermined duration from when a transition from the on-hook state to the off-state is made in response to the determination that the voltage value has been continuously equal to or lower than the threshold voltage for the first predetermined duration.

4. The communication control device according to claim 3, wherein the setting changer changes a setting of the third predetermined duration.

5. The communication control device according to claim 1, further comprising:
  a connection determiner configured to determine whether or not an external device is connected to a communication apparatus, the communication apparatus being a subject of the control performed by the communication control device on communication over the communication line, and whether or not the communication apparatus is connected to a communication network; and
  an operating-mode transition controller configured to control operating-mode transition of the communication apparatus,
  wherein if a determination that the communication line is disconnected and a determination that an external device is not connected to the communication apparatus and the communication apparatus is not connected to a communication network are made, the operating-mode transition controller causes operating-mode transition of the communication apparatus to a power-off mode to occur.

6. The communication control device according to claim 1, wherein the communication control device performs processing for determining whether or not the communication line is disconnected when a communication apparatus, the communication apparatus being a subject of the control performed by the communication control device on communication over the communication line, is to be shipped to Europe.

7. A communication apparatus comprising the communication control device according to claim 1.

8. An image forming apparatus comprising the communication control device according to claim 1.

9. A non-transitory computer-readable recording medium having control program instructions that, when executed by a communication control device for controlling communication performed over a communication line, cause the communication control device to perform:
  (a) acquiring a voltage value of a line-to-line voltage of the communication line in an on-hook state;
  (b) determining whether the acquired voltage value has been continuously equal to or lower than a threshold voltage for a first predetermined duration;
  (c) performing an off-hook operation when the determination in (b) indicates that the voltage value has been continuously equal to or lower than the threshold voltage for the first predetermined duration;

(d) acquiring a current value of a line current flowing through the communication line in an off-hook state in a case that the determination in (b) indicates that the voltage value has been continuously equal to or lower than the threshold voltage for the first predetermined duration;

(e) determining whether the acquired current value has been continuously equal to or lower than a threshold current for a second predetermined duration; and (f) determining that the communication line is disconnected in a case that the determination in (e) indicates that the current value has been continuously equal to or lower than the threshold current for the second predetermined duration is made.

\* \* \* \* \*